UNITED STATES PATENT OFFICE.

DUDLEY B. CHAPMAN, OF MILFORD, MASSACHUSETTS, ASSIGNOR TO HIMSELF AND EBENEZER D. DRAPER, OF SAME PLACE.

IMPROVEMENT IN THE MANUFACTURE OF SILICATE SOAP.

Specification forming part of Letters Patent No. 38,354, dated April 28, 1863.

*To all whom it may concern:*

Be it known that I, DUDLEY B. CHAPMAN, a resident of Milford, in the county of Worcester and State of Massachusetts, have invented a new and useful Compound to be Used in the Manufacture of Soap; and I do hereby declare the same to be fully described in the following specification.

The nature of my invention consists in the combination of a liquid alkaline silicate and certain substances, as hereinafter described, which shall render it capable of uniting in any desired proportion with saponified fat or oil, and which, when it is so united, shall by their absorbent power take up and retain the excess of water, and thus impart firmness to the finished soap and prevent shrinkage.

To enable others skilled in the art of soap-making to make and use my invention, I will proceed to describe its manufacture and application.

The ingredients of the compound constituting my invention are as follows: first, two parts, by weight, of dry starch or some vegetable substance containing a large proportion of starch, gum, or mucilage, such as wheat-flour, shorts, cornmeal, bean-flour, linseed-meal, or ground oil-cake; second, four parts, by weight, of liquid silicate of soda or potash; and third, two parts, by weight, of crystallized sulphate of soda.

To effect the combination, I first melt the salt in its water of crystallization. Then I stir in slowly the starch, flour, or meal. Lastly, I add the silicate and keep up the agitation till the whole becomes a uniform pasty mass.

Instead of two parts of crystallized sulphate of soda, I sometimes take one part, by weight, of the anhydrous sulphate or of an anhydrous carbonate of soda and one part, by weight, of water and proceed with the aid of heat to incorporate such with the other ingredients, as just mentioned.

In applying this compound to the manufacture of an improved soap the mixture should be prepared as it is wanted and incorporated while it is yet warm and soft with the desired quantity of freshly-made and still fluid soap immediately before running the same out into frames or molds to cool.

The use of the starch or kindred substance is to give body to the alkaline silicate and absorb and retain its water, so that soap to which the compound may be added shall not shrink on exposure to dry air. Moreover, farinaceous or mucilaginous matter tends to moderate the causticity of the alkali in the silicate. As the silicate, on account of its inherent glutinous character, will not readily unite with dry farinaceous or gummy substances, and a previous wetting of the vegetable flour greatly facilitates the mixture, a melted aqueous salt is used, so as to effect the moistening with a substance capable of resuming the solid form on cooling. When a vegetable flour is used which contains any acid or oleaginous matter, or when the silicate of soda contains a great excess of silica, I find sal-soda or an equivalent mixture of soda-ash and water to answer best for imparting the requisite moisture and bringing about the union of the ingredients. In other cases I generally prefer Glauber's salt or sulphate of soda. Sometimes, however, a mixture of sulphate and carbonate proves more suitable than either salt by itself.

I by no means restrict myself to the before-mentioned proportions of ingredients, but sometimes largely increase the amount of farinaceous matter, and thus make the compound fit for molding into bars or cakes and serving by itself as a complete substitute for soap.

I do not herein claim the combination of a crystallized or hydrated carbonate of soda with an alkaline silicate and a vegetable flour, such being the subject of Letters Patent No. 36,693 on an invention made by me.

What I do claim as my invention is—

The combination of an alkaline silicate, a sulphate of soda or an anhydrous carbonate of soda, and a farinaceous or mucilaginous substance, the whole being substantially as described, and for use as an ingredient of soap.

DUDLEY B. CHAPMAN.

Witnesses:
JAMES R. DAVIS,
S. W. HAYWARD.